Feb. 10, 1970  G. W. GILLEMOT  3,495,026
CABLE SPLICE BOOT
Filed May 16, 1968
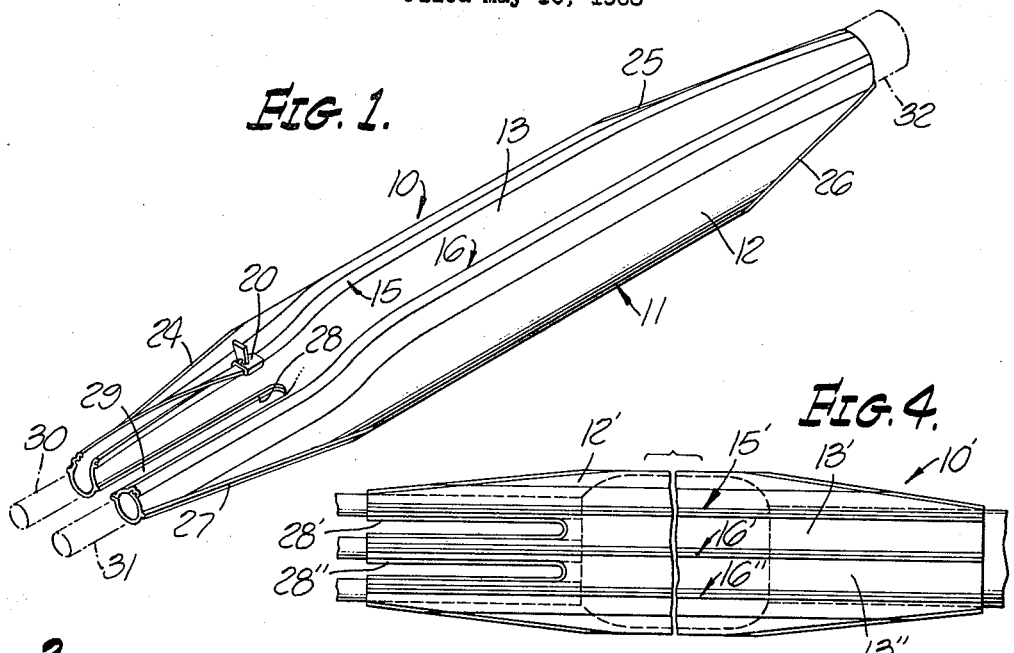
FIG. 1.
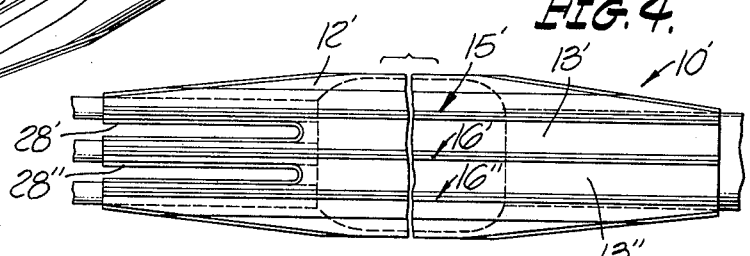
FIG. 4.
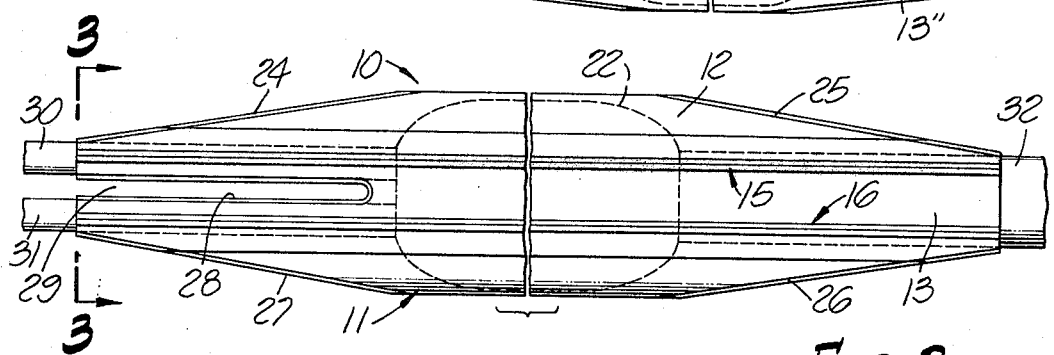
FIG. 2.
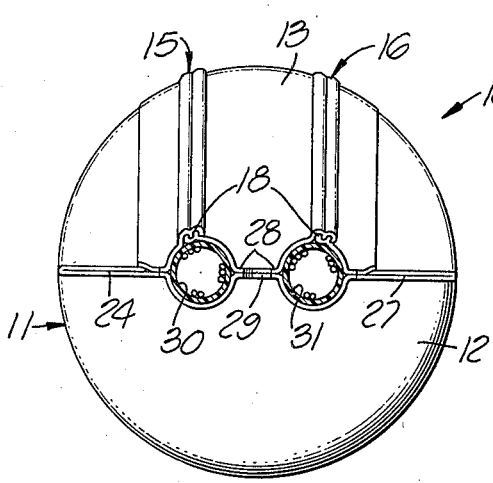
FIG. 3.
INVENTOR
GEORGE W. GILLEMOT
BY
ATTORNEYS United States Patent Office 3,495,026
Patented Feb. 10, 1970

3,495,026
CABLE SPLICE BOOT
George W. Gillemot, Venice, Calif., assignor to Walter A. Plummer, Sherman Oaks, Calif.
Filed May 16, 1968, Ser. No. 729,773
Int. Cl. H01b 17/56; H02g 15/08
U.S. Cl. 174—138                2 Claims

ABSTRACT OF THE DISCLOSURE

A unitary splice boot adapted to enclose a splice junction between a main cable and a plurality of branchout cables aligned therewith. To permit the one-piece boot to be assembled over the splice from one side thereof, the boot is of wide configuration and provided with an integral seam-forming strip extending the full length of the boot and attached to the main body along the adjacent edges of the individual arms. This strip includes seam means along its lateral edges mateable with seam means along the adjacent edges of the main body.

---

This invention relates to cable splice boots and more particularly to a simply-constructed inexpensive one-piece boot of flexible impervious material adapted to be assembled about the splice junction between three or more multiple conductor cables in general alignment with one another.

Electrical cables, particularly of the type employed in communication work and in the distribution of power not infrequently require a junction between a main cable and two or more branchout cables. Such splice junctions must be protected from the elements and particularly against any possibility of moisture entering the open cable while the splice is being made and before it is permanently sealed and sheathed. In particular, there is need for a simple easily-applied fool-proof, fluid-tight cover for temporary application during intervals between splicing periods, as overnight, or over a weekend. Temporary splice covers meeting this need have been provided heretofore for splices between a pair of aligned cable ends. However, this type of boot cannot be relied upon to enclose a splice between three cables.

The present invention meets this latter need and provides a highly satisfactory, easily applied boot. The construction features unitary assembly having one or more slots opening through one end and arranged to provide a plurality of generally parallel tubular enclosures at that end integral with the main body of the boot and sized to enclose separate branchout cables. The single tubular outlet at the other end of the boot is adapted to embrace and seal against the sheath of the main cable. The boot includes separate seams opening through its opposite ends with one seam extending along each arm of its split end. This strip is fused or permanently secured to the edges of the split end of the boot thereby avoiding any possibility of becoming detached or misplaced. The open end double seam construction permits the boot to be assembled about spliced endless cables from one side following which the individual seams are closed. Thereafter the end of the main body and of each branch are suitably clamped or sealed to a respective one of the cable sheaths until a workman wishes to have access to the splice.

It is, therefore, a primary object of the present invention to provide an improved unitary boot of simple inexpensive construction specially constructed for assembly about a splice between the junction of three or more cables.

Another object of the invention is the provision of an improved splice boot of Y-shape having its Y-arms in closely-spaced parallel arrangement and sized to snugly embrace a respective branchout cable and having a stem portion sized to embrace a main cable.

Another object of the invention is the provision of a one-piece splice boot for a multiple-branch cable splice featuring a plurality of open-ended interlocking seams extending generally parallel to one another with each seam extending along a respective one of the branchouts.

These and other more specific objects will appear upon reading the following specification and claims and upon considering in connection therewith the attached drawing to which they relate.

FIGURE 1 is a perspective view of a preferred embodiment of the invention splice boot showing the same in the final phase of the assembly operation;

FIGURE 2 is a top plan view of the invention boot assembled to a three-cable splice;

FIGURE 3 is a cross-sectional view on an enlarged scale taken along line 3—3 on FIGURE 2; and FIGURE 4 is a view similar to FIGURE 2 of the invention boot provided with three outlets at one end and separate seams for each outlet extending the full length of the boot.

Referring to FIGURES 1 to 3, there is shown an illustrative embodiment of the invention splice boot, designated generally 10. In general, the boot comprises an elongated tubular jacket 11 of suitable flexible sheet thermoplastic material, such as polyvinyl chloride, polyethylene and the like plastic compositions commonly available on the market. The main body is preferably fabricated from two rectangular blanks of sheet plastic of the same length and including a relatively wide blank 12 and a narrow blank 13. The opposite lateral edges of both blanks are adapted to be held separately joined to one another by similar seam forming tapes 15 and 16 extending throughout the length of these blanks. As best appears from FIGURE 3, seams 15 and 16 are formed from extruded plastic material and the free edges of each seam include interlocking tongues and grooves 18 of any well known construction contoured to interlock upon the application of pressure and usually closed and opened by the use of a suitable slider device 20 (FIGURE 1). A short length of seam 15 is shown in open condition while the remainder is shown closed.

Splice boot 10 is conveniently fabricated by bonding the interlocking seam-forming assemblies 15 and 16 of the two blanks 12, 13. At this stage of the fabrication, the two rectangular blanks are of uniform width for the full length thereof. The seams of the two blanks are closed to form a single tube having a diameter corresponding to the midlength diameter illustrated in FIGURES 2 and 3 and adequate to enclose the spliced conductors indicated in dotted lines 22 in FIGURE 2. The tubular boot is now flattened with the seams 15, 16 lying equally spaced to either side of the longitudinal center line. The flattened edges of the tube are then heat sealed together along the diagonal seams 24, 25, 26 and 27 and along the U-shaped seam 28. Seam 28 forms a narrow elongated slot 29 opening through one end of the boot, the width of the slot corresponding generally to the spacing between a pair of branchout cables 30, 31.

Seams 24, 25, 26 and 27 converge toward the opposite ends of the boot at an angle such as that illustrated in the drawing. Desirably, these tapering seams converge sufficiently to provide tubular outlets accommodating the smallest size cables likely to be encountered in the field. The resulting product may then be applied about larger diameter cable simply by cutting off an appropriate length of either end of the boot.

The excess material or flashing left after seams 24 through 28 are formed is then removed leaving a finished product having the appearance shown in the drawing.

The resulting spliced boot may be appropriately described as Y-shaped, the stem of which comprises the main body or larger diameter end of the boot and the two smaller diameter portion of which form the arms of the Y.

It will be apparent from the foregoing that the described splice boot comprises a unitary structure provided with two seams 15, 16 extending parallel to one another for the full length of the boot. The intervening strip 13 between the two seams is integrally joined to the main body strip 12 by U-shaped seam 28. It is therefore impossible for this component to become detached or misplaced prior to or during the assembly operation or at a later time if the boot is opened for servicing the splice.

The boot is assembled to endless cables joined together by a splice 22 during intervals between splicing and testing operations. To make the assembly, the serviceman fully opens seams 15 and 16 and then applies the boot about the splice junction from one side of the three cables and proceeds to close first one and then the other of seams 15 and 16 by the application of pressure to the overlapped edges or by the use of slider device 20. To assure against the possibility of moisture entering the boot, it is preferable to apply a sealing agent to the tongues and grooves of the seams immediately prior to the closing. A liquid solvent for the plastic forms an excellent sealing agent. Immediately following application of the solvent the seams are closed whereupon the sealant bonds each permanently closed in a fluid-tight manner. Thereafter, the opposite ends of the boot are sealed and clamped to the respective cables by wrapping the ends with sealing tape and if desired the application of a cable clamp. These components are not shown since they do not in and of themselves form a part of the invention and are well known to those skilled in this art.

When the serviceman wishes to resume work on the splice he usually slits the boot and discards it owning to its inexpensive nature and the importance of avoiding risk of a leak when again temporarily enclosing the splice.

Another illustrative embodiment of the invention is shown in FIGURE 4 and differs from that shown in FIGURES 1–3 essentially in the presence of three branchouts at the left hand end in lieu of the two branchouts shown in the first described embodiment. In view of the substantial identity of the two constructions in other respects the same reference characters are employed to designate the same part of feature and are distinguished by the application of a prime. For this reason, it will be unnecessary to describe each of the parts and details. Significantly, however, the FIGURE 4 embodiment includes all the features and advantages of the first embodiment including in particular a one-piece unitary construction in which the two long main body strips 13′, 13″ correspond with strips 13 in FIGURES 1 and 2 and each is bonded or otherwise secured to the main body 12′ along the bonded seams 28′, 28″. It will likewise be understood that the three seams 15′, 16′ and 16″ extend for the full length of boot 10′ with the result that, as in the first embodiment, the boot proper can be assembled about a multiple cable junction from one side and the individual seams closed to encircle the entire junction.

While the particular cable splice boots herein shown and disclosed in detail are fully capable of attaining the objects and providing the advantages hereinbefore stated, it is to be understood that the described constructions are merely illustrative of the presently preferred embodiments of the invention.

I claim:
1. A cable splice boot adapted to be readily assembled about a splice between a main cable and a plurality of branch cables, said splice boot comprising an elongated unitary tubular jacket having a main body of impervious supple thermoplastic sheeting the opposite lateral edges of which are folded toward one another to lie in spaced-apart relation for the full length of said main body, the opposite end corners of the so-folded main body being bonded together along lines converging toward the opposite ends of said splice boot and trimmed away along the remote edges of said lines of bonding, at least one elongated filler strip extending from end-to-end of said splice boot having a width corresponding to the spacing between the lateral edges of said folded main body and having narrow slot extending lengthwise through one end portion thereof with the edges of said slot fused to the edges of a similarly shaped slot opening through one end of said main body in an area between the lateral edges thereof, said filler strip having its opposite lateral edges free of fixed attachment to said main body from en-to-end thereof and positioned closely adjacent a respective one of the lateral edges of said main body, and the adjacent lateral edges of said filler strip and of said main body having complementally shaped tongue and groove means adapted to interlock and form a pair of separable snug fitting seams extending the full length of said splice boot, and said splice boot being adapted to be assembled about and disassembled from a main cable and a plurality of branchout cables while conductors of said cables are spliced together provided said pairs of seams are first fully opened to permit the spliced cables to be fitted within the fully opened splice boot.

2. A one-piece cable splice boot for assembly about a multiple branch cable junction, said assembly comprising a tubular main body of supple thermoplastic material having a single opening through a first end and three generally parallel openings through its second end, said last mentioned openings being separated from one another by a pair of long narrow open-ended slots, said splice boot including a pair of independent long narrow Y-shaped strips of plastic extending the full length thereof, said Y-shaped strips each having a long stem extending along the major length of said splice boot with the end of said stem free for insertion between a pair of closely-spaced cables while said jacket is being assembled about the junction between a plurality of generally coaxial cable ends and having the inner edges of its arms bonded to the juxtaposed edges of an associated one of said open-ended slots, and said jacket having pairs of separable interlocked seam-forming means extending the length of and through an opening at each end of said splice boot assembly and bonded to the outer lateral edges of each of said Y-shaped strips and to the adjacent lateral edges of the main body of said splice boot.

References Cited

UNITED STATES PATENTS 3,180,923  4/1965  Gow et al.
3,187,090  6/1965  Edwards.
3,423,515  1/1969  Eichberg.

LARAMIE E. ASKIN, Primary Examiner

U.S. Cl. X.R.
174—72, 92